US010159924B2

United States Patent
Kippel et al.

(10) Patent No.: US 10,159,924 B2
(45) Date of Patent: Dec. 25, 2018

(54) INLET AIR FILTRATION SYSTEM WITH SELF-CLEANING HYDROPHOBIC FILTER BAG

(71) Applicant: GENERAL ELECTRIC COMPANY, Schenectady, NY (US)

(72) Inventors: Bradly Aaron Kippel, Greer, SC (US); Doug Byrd, Greer, SC (US); Giorgio Marchetti, Porto Recanati (IT)

(73) Assignee: General Electric Company, Schenectady, NY (US)

( * ) Notice: Subject to any disclaimer, the term of this patent is extended or adjusted under 35 U.S.C. 154(b) by 767 days.

(21) Appl. No.: 14/494,706

(22) Filed: Sep. 24, 2014

(65) Prior Publication Data

US 2016/0084161 A1 Mar. 24, 2016

(51) Int. Cl.
*B01D 46/00* (2006.01)
*B01D 46/02* (2006.01)
*F02C 7/055* (2006.01)

(52) U.S. Cl.
CPC ......... *B01D 46/02* (2013.01); *B01D 46/0023* (2013.01); *B01D 46/0068* (2013.01); *F02C 7/055* (2013.01); *F05D 2260/607* (2013.01); *F05D 2300/512* (2013.01)

(58) Field of Classification Search
CPC .... B01D 46/00; B01D 46/02; B01D 46/0023; B01D 46/0068; F02C 7/055; F05D 2260/607; F05D 2300/512

USPC .............................. 55/302, 341.1–341.7, 372
See application file for complete search history.

(56) References Cited

U.S. PATENT DOCUMENTS

| | | | |
|---|---|---|---|
| 6,368,386 B1 | 4/2002 | Nelson et al. | |
| 6,875,256 B2 | 4/2005 | Gillingham et al. | |
| 7,316,723 B2 | 1/2008 | Chung et al. | |
| 7,318,853 B2 | 1/2008 | Chung et al. | |
| 7,686,343 B2 | 3/2010 | Getman et al. | |
| 8,182,587 B2 | 5/2012 | Hiner et al. | |
| 8,709,118 B2 | 4/2014 | Chung et al. | |
| 2003/0167740 A1* | 9/2003 | Murphy | B01D 45/16 55/337 |
| 2005/0060969 A1* | 3/2005 | Volkmann | B01D 46/0023 55/315 |
| 2008/0300568 A1* | 12/2008 | Fujioka | A61F 13/15593 604/385.27 |
| 2010/0050873 A1 | 3/2010 | Hiner et al. | |
| 2010/0054919 A1 | 3/2010 | Hiner et al. | |
| 2013/0011249 A1 | 1/2013 | Kippel et al. | |
| 2013/0195690 A1 | 8/2013 | Iyer et al. | |
| 2013/0255208 A1 | 10/2013 | Zhang et al. | |
| 2014/0237957 A1* | 8/2014 | Kohn | B01D 46/0016 55/341.1 |

* cited by examiner

*Primary Examiner* — T. Bennett McKenzie
(74) *Attorney, Agent, or Firm* — Eversheds Sutherland (US) LLP

(57) ABSTRACT

The present application provides a pulse filtration system for use with a compressor of a gas turbine engine. The pulse filtration system may include a pulse filter, a compressed air system in communication with the pulse filter, and a hydrophobic filter bag surrounding the pulse filter in whole or in part.

20 Claims, 3 Drawing Sheets

INLET AIR FILTRATION SYSTEM WITH SELF-CLEANING HYDROPHOBIC FILTER BAG

TECHNICAL FIELD

The present application and the resultant patent relate generally to gas turbine engines and more particularly relate to an inlet air filtration system with a breathable filter bag positioned about a self-cleaning pulse filter element for improved filter life, a reduced long term pressure drop thereacross, and preventing the entry of moisture.

BACKGROUND OF THE INVENTION

Gas turbine engines and other types of power generation equipment use a large volume of intake air to support the combustion process. Various types of inlet air filtration systems thus may be used upstream of the compressor. Impure air latent with dust particles, salt, debris, and other types of contaminants may damage the compressor blades, plug cooling passages, and damage other types of turbine components via corrosion, erosion, fouling, and the like. Such damage may reduce the life expectancy and performance of the gas turbine engine and other types of power generation equipment. To avoid these problems, the inlet air generally passes through a series of filters and screens to assist in removing the contaminants before they enter into the compressor.

One type of air inlet filtration system includes the use of a pulse filtration system. A pulse filtration system generally includes a number of pulse filters having a porous media filter element in communication with a source of compressed air. The pulse filtration system may be self-cleaning via a brief reverse pulse of the compressed air. The reverse pulse flexes the porous media filter element so as to dislodge the accumulated debris and other contaminants on the surface thereof.

The overall lifetime of the filters may be of concern, particularly in areas with high dust loading. Replacing the filters carries a cost in hardware, in material, as well as in lost power generation output. This reduced lifetime may be mitigated somewhat by the use of an oversized filter house. Such an oversized filter house, however, includes at least an initial increase in overall capital costs. Another issue may be that the pressure drop across the filters may increase over time as the filters collect dust and other types of debris thereon. As the inlet pressure drop increases, the overall output of the gas turbine engine may decrease. The cleaning efficiency of even a pulse filtration system thus may decay overtime as dust and other types of debris migrate into the filter media element. Eventually, the filters may need to be replaced to achieve the desired pressure drop thereacross.

Similarly, filter systems designed, for example, for coastal areas, may use filters for both dust and debris removal as well as for water removal. Water may combine with the dust so as to create pressure drop spikes. Given such, moisture separators/coalescing filters may be used. Multi-stage systems may be used with one system for dust and debris and a secondary system for water removal. Other systems may use a hydrophobic membrane laminated to the filter media or a hydrophobic media. Different types of oleophobic materials also may be used. These filters prevent free moisture from entering the compressor. The multi-stage filter systems, however, may be expensive and may cause an additional pressure drop. The laminated filters also may cause pressure drop spikes caused by fouling or water being trapped between the membrane and the base media. The hydrophobic media may be made from fragile glass fibers that may be damaged by pulsing.

There is thus a desire for an improved inlet air filtration system for use with pulse filters and the like and methods of use thereof. Such improved systems and methods preferably may avoid the accumulation of dirt, debris, and other types of contaminants without an increased pressure drop therethrough. Moreover, such improved systems and methods also may accommodate water removal. Overall system efficiency and performance also should be improved in a cost effective manner and with reduced overall downtime.

SUMMARY OF THE INVENTION

The present application and the resultant patent provide a pulse filtration system for use with a compressor of a gas turbine engine. The pulse filtration system may include a pulse filter, a compressed air system in communication with the pulse filter, and a hydrophobic filter bag surrounding the pulse filter in whole or in part to limit the intake of dust, debris, and water.

The present application and the resultant patent further provide a method of cleaning a pulse filter positioned about a compressor of a gas turbine engine. The method may include the steps of positioning a hydrophobic filter bag over the pulse filter, conforming the hydrophobic filter bag to the pulse filter in whole or in part in a contracted configuration, pulsing compressed air through the pulse filter and the hydrophobic filter bag, and forcing the hydrophobic filter bag into an expanded configuration to remove debris and/or water thereon.

The present application and the resultant patent further provide a pulse filtration system for use with a compressor of a gas turbine engine. The pulse filtration system may include a porous media pulse filter, a compressed air system in communication with the porous media pulse filter, and an expandable hydrophobic filter bag surrounding the porous media pulse filter in whole or in part such that the expandable hydrophobic filter bag may be forced into an expanded configuration by a pulse of compressed air from the compressed air source.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
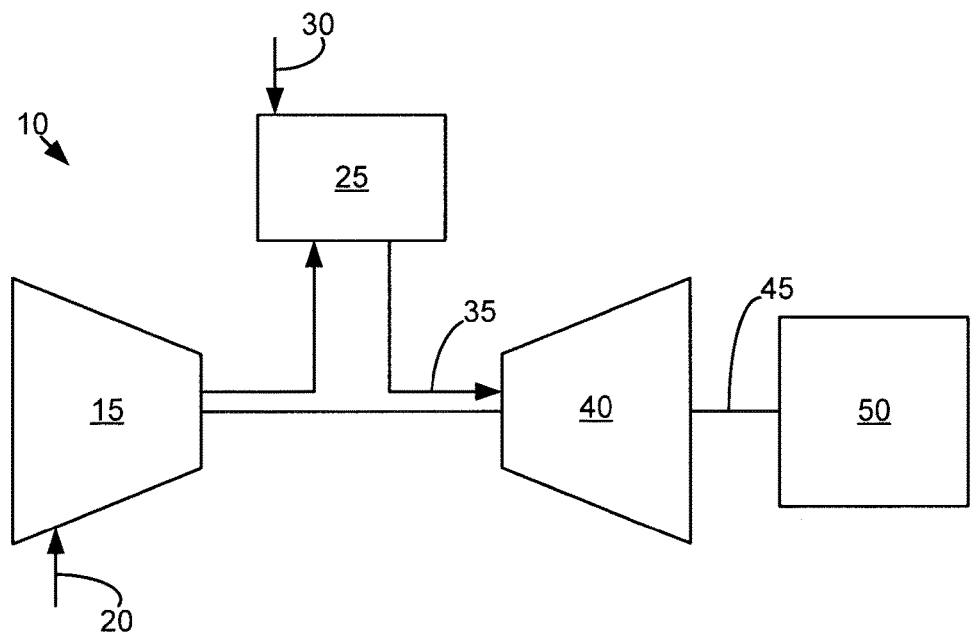
FIG. 1 is a schematic diagram of a gas turbine engine showing a compressor, a combustor, a turbine, and a load.

Referring now to the drawings, in which like numerals refer to like elements throughout the several views, FIG. 1 shows a schematic diagram of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25 arranged in a circumferential array or otherwise. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, liquid fuels, various types of syngas, and/or other types of fuels and blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
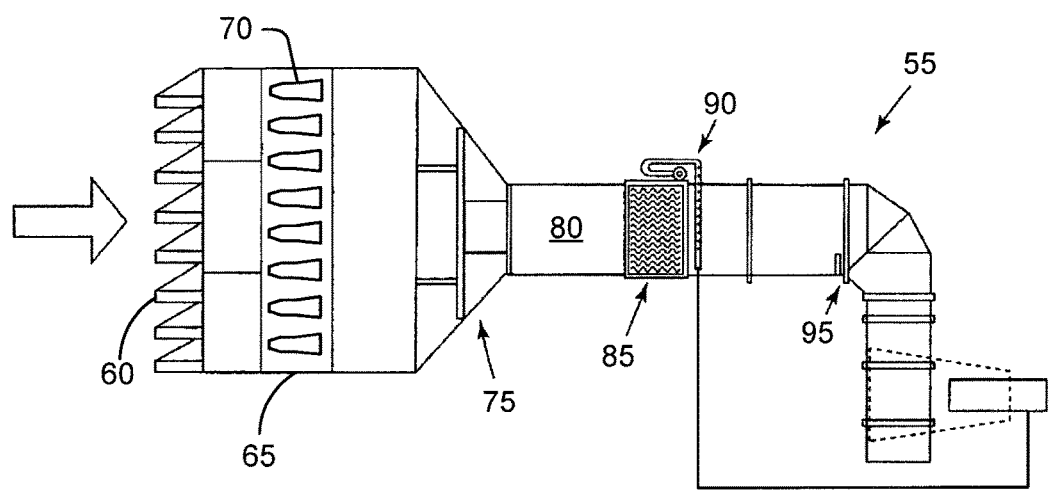
FIG. 2 is a schematic diagram of an inlet air filtration system as may be used with the gas turbine engine of FIG. 1.

FIG. 2 is a schematic diagram of a turbine inlet air system 55. The turbine inlet air system 55 may be integrated with the compressor 15 of the gas turbine engine 10 described above and the like. The turbine inlet air system 55 may include a weatherhood 60. The weatherhood 60 may prevent weather elements such as rain, snow, hail, and the like from the flow of air 20 from entering the compressor 15. The weatherhood 60 may be mounted on an inlet filter house 65. The inlet filter house 65 may have a number of pulse filters 70 mounted therein. As described above, the pulse filters 70 remove dust and other types of contaminants and impurities from the incoming flow of air 20. Generally described, the pulse filter 70 may have a conical section and a cylindrical section mounted together via a yoke assembly. As described above, the pulse filters 70 may be self-cleaning via a brief reverse pulse of compressed air therethrough so as to dislodge contaminants thereon. Other types of filters and filtration systems also may be used.

A transition piece 75 may extend downstream of the inlet filter house 65 and extend into an inlet duct 80. The inlet duct 80 may extend to an inlet of the compressor 15. A silencer section 85 and an inlet bleed heat system 90 also may be used herein. One or more screens 95 may be used to deflect larger types of contaminants and/or debris. The turbine inlet air system 55 described herein is for the purpose of example only. Turbine inlet air systems of many other configurations and with many different components also may be known.

Figure 3:
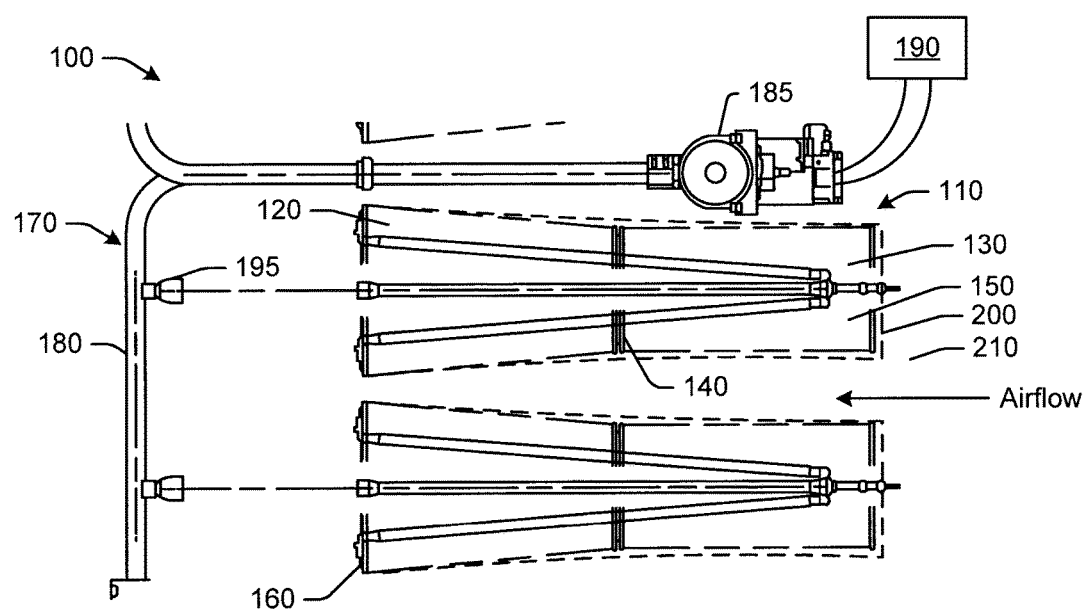
FIG. 3 is a partial sectional diagram of an inlet air pulse filtration system as may be described herein.
Figure 4:
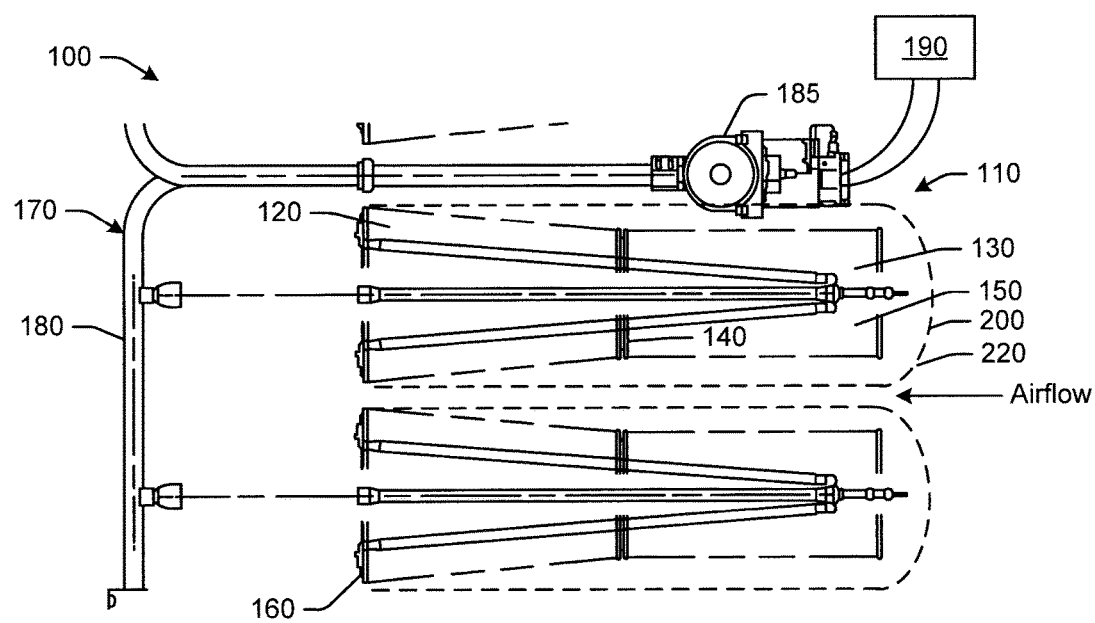
FIG. 4 is a further partial sectional view of the inlet air pulse filtration system of FIG. 3.

FIGS. 3 and 4 show a pulse filtration system 100 as may be described herein. The pulse filtration system 100 may include any number of pulse filters 110. Generally described, the pulse filters 110 may include a conical section 120 and a cylindrical section 130. The conical section 120 and the cylindrical section 130 may be joined via a gasket 140 and the like. The shape of the pulse filters 110 also may include cones, cylinders, squares, rectangles, and combinations thereof. The pulse filters 110 may have any suitable size, shape, or configuration. The pulse filters 110 may be oriented horizontally, vertically, or at any angle. The pulse filters 110 may be single or stacked pairs.

The pulse filters 110 may include a porous media filter 160. The porous media filter 150 may be a web of synthetic fibers, cellulose fibers, glass fibers, or any combination as a mixed or blended media. The porous media filter 150 may be pleated or non-pleaded. Other types of porous media filters may be used herein in any suitable size, shape, or configuration. Different types of porous media filters may be used herein together.

The pulse filtration system 100 may include a filter element support structure 160. The filter element support structure 160 may have any suitable size, shape, or configuration. The pulse filtration system 100 also may include a compressed air system 170 positioned about the filter element support structure 160 or elsewhere. The compressed air system 170 may have associated air piping 180 and one or more control valves 185. The air piping 180 may extend from a compressed air source 190 to a nozzle 195 or other structure. The compressed air system 170 may be of conventional design. The compressed air system 170 may have any suitable size, shape, or configuration. Other components and other configurations may be used herein.

In this example, the porous media filters 150 may be enclosed by a filter bag 200. The filter bag 200 may be made from materials that may be expandable and breathable. The filter bag 200 may be made out of similar materials as compared to the porous media filter 150. Alternatively, polypropylene, polyester, nylon, PTFE, ePTFE, or similar types of materials also may be used herein. The filter bags 200 may have hydrophobic ("water-fearing") and/or oleophobic ("oil-fearing") properties in whole or in part.

The filter bags 200 may conform to the size and shape of the porous media filters 150 such that the filter bags 200 also may include the conical section 120 and the cylindrical section 130. Other shapes may be used herein. FIG. 3 shows the pulse filtration system 100 with the filter bag 200 thereon in a contracted configuration 210 prior to pulsing. FIG. 4 shows the pulse filtration system 100 during pulsing in an expanded configuration 220. As is shown, the filter bag 200 expands outwardly from the porous media filter 150 via the pulse of compressed air. Other components and other configurations may be used herein.

The pulse filtration system 100 thus includes the porous media filter 150 wrapped or otherwise surrounded by the filter bag 200 in whole or in part. When cleaned with a reverse pulse of compressed air, the filter bag 200 expands so as to dislodge the dust cake and/or other types of debris that may have accumulated thereon. This dust and debris removal may allow the pulse filtration system 100 to have a reduced pressure drop thereacross as well as increasing the overall filter cleaning efficiency so as to extend the life of the porous media filter 150. Specifically, the use of the filter bag 200 may reduce the rate of dust migration into the porous media filter 150 over time. The filter bag 200 may promote loading on the surface of the bag so as to result in a more complete dust cake removal during pulsing. Moreover, the use of the filter bag 200 provides these benefits in the same footprint as a conventional filtration system so as to avoid the need for an enlarge filter house and the associated capital costs. The filter bag 200 also may have the further advantage of being installed and replaced without the need to remove the porous media filters 150 for improved overall maintenance efficiency.

Moreover, if the filter bag 200 has hydrophobic and/or oleophobic properties, the filter bag 200 may have the additional benefit of protecting the porous media filter 150 from water and oils. The hydrophobic filters may remove free moisture from entering the compressor 15 as well as protect the porous media filter 150. Specifically, the water and oils may react with the dust cake and other types of debris so as to cause pressure drop spikes and a resultant shorter filter life. Further, upstream water removal items such as moisture separators, coalescing filters, and the like may be removed and/or reduced in size and/or configuration. Likewise, coastal icing sites may use the filter bag 200 alone instead of using a multistage static filter system with a heating coil.

The filter bag 200 thus protects the pulse filters 110 from water, mist, fog, and the like so as to promote a long filter life. Moreover, the filter bag 200 prevents liquids from passing through the pulse filters 110. Likewise, the filter bag 200 prevents deliquidesence of water soluble material through the pulse filters 110.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A pulse filtration system comprising:
    a gas turbine engine with a compressed air system;
    a pulse filter comprising a first section having a first cross-sectional geometry and a second section having a second cross-sectional geometry that is different than the first cross-sectional geometry;
    the compressed air system in communication with the pulse filter; and
    a hydrophobic filter bag surrounding the pulse filter in whole or in part.

2. The pulse filtration system of claim 1, further comprising a plurality of pulse filters.

3. The pulse filtration system of claim 1, wherein the compressed air system comprises a compressed air source and air piping in communication with the pulse filter.

4. The pulse filtration system of claim 1, wherein the hydrophobic filter bag comprises polypropylene, polyester, nylon, PTFE, and/or ePTFE.

5. The pulse filtration system of claim 1, wherein the hydrophobic filter bag comprises an expandable and breathable material.

6. The pulse filtration system of claim 1, wherein the hydrophobic filter bag comprises an oleophobic material.

7. The pulse filtration system of claim 1, wherein the hydrophobic filter bag comprises a first bag section and a second bag section that conform to the respective first section and second section of the pulse filter in a contracted configuration.

8. The pulse filtration system of claim 1, wherein the hydrophobic filter bag comprises an expanded configuration under a pulse of compressed air.

9. The pulse filtration system of claim 1, wherein the hydrophobic filter bag may be removed without removing the pulse filter.

10. The pulse filtration system of claim 1, wherein the hydrophobic filter bag limits liquids from reaching the pulse filter.

11. The pulse filtration system of claim 1, wherein the hydrophobic filter bag prevents liquids from passing through the pulse filter.

12. A method of cleaning a pulse filter positioned about a compressor of a gas turbine engine, comprising:
    positioning a hydrophobic filter bag over the pulse filter, wherein the pulse filter comprises a first section having a first cross-sectional geometry and a second section having a second cross-sectional geometry that is different than the first cross-sectional geometry;
    conforming the hydrophobic filter bag to the pulse filter in whole or in part in a contracted configuration;
    pulsing compressed air through the pulse filter and the hydrophobic filter bag; and
    forcing the hydrophobic filter bag into an expanded configuration to remove debris and/or water thereon.

13. A pulse filtration system comprising:
    a gas turbine engine with a compressed air system;
    a porous media pulse filter comprising a first section having a first cross-sectional geometry and a second section having a second cross-sectional geometry that is different than the first cross-sectional geometry;
    the compressed air system in communication with the porous media pulse filter; and
    an expandable hydrophobic filter bag surrounding the porous media pulse filter in whole or in part such that the hydrophobic expandable filter bag may be forced into an expanded configuration by a pulse of compressed air from the compressed air source.

14. The pulse filtration system of claim 13, wherein the hydrophobic filter bag comprises polypropylene, polyester, nylon, PTFE, and/or ePTFE.

15. The pulse filtration system of claim 13, wherein the hydrophobic filter bag comprises a contracted configuration conforming to the pulse filter.

16. The pulse filtration system of claim 13, wherein the hydrophobic filter bag may be removed without removing the pulse filter.

17. The pulse filtration system of claim 13, wherein the hydrophobic filter bag limits liquids from reaching the pulse filter.

18. The pulse filtration system of claim 13, wherein the hydrophobic filter bag prevents liquids from passing through the pulse filter.

19. The pulse filtration system of claim 1, further comprising a gasket joining the first section of the pulse filter to the second section.

20. The pulse filtration system of claim 1, wherein the first cross-sectional geometry has a first radius that is greater than a second radius of the second cross-sectional geometry.

* * * * *